United States Patent [19]
Miller et al.

[11] Patent Number: 5,560,535
[45] Date of Patent: Oct. 1, 1996

[54] FLEXIBLE BODY FRAMING SYSTEM

[75] Inventors: Kenneth R. Miller, Clinton Twp; John E. Robertson, Troy; Robert M. Long, Shelby, all of Mich.

[73] Assignee: Western Atlas, Inc., Hebron, Ky.

[21] Appl. No.: 413,776

[22] Filed: Mar. 30, 1995

[51] Int. Cl.⁶ .................................................. B23K 37/02
[52] U.S. Cl. ............................................................ 228/49.1
[58] Field of Search .............................. 228/49.8, 49.1; 74/105, 106

[56] References Cited

U.S. PATENT DOCUMENTS

| | | | |
|---|---|---|---|
| 3,737,952 | 6/1973 | Lunden | 74/105 |
| 4,682,722 | 7/1987 | Bossotto et al. | 228/49.8 |
| 4,856,701 | 8/1989 | Pöckl | 228/49.8 |
| 5,400,943 | 3/1995 | Rossi | 228/6.1 |
| 5,400,944 | 3/1995 | Zimmer et al. | 228/49.8 |

*Primary Examiner*—Kenneth J. Ramsey
*Attorney, Agent, or Firm*—Barnes, Kisselle, Raisch, Choate, Whittemore & Hulbert

[57] ABSTRACT

A framing system having upright stands on opposite sides of a vehicle body support. Welding fixtures are mounted on the stands having welding tools for performing welding operations on a vehicle body. The stands are supported for linear movement toward and away from an operative position adjacent the vehicle body support. Loaders are provided for transferring fixtures to and from the stands.

14 Claims, 8 Drawing Sheets

FLEXIBLE BODY FRAMING SYSTEM

FIELD OF THE INVENTION

This invention relates generally to a body framing system and more particularly to a framing system for welding together certain parts of an automotive vehicle body.

BACKGROUND OF THE INVENTION

Body framing is the process of joining the body side frames and various sub-assemblies to the vehicle underbody to form a dimensionally stable body structure. The body parts are typically "toy-tabbed" prior to the framing operation. Toy-tabbing enables those parts to be welded to "float" so that they may be properly located in the frame operation. The various welding tools, body clamps and locators are often mounted on a single fixture. Frequently, it is necessary to make tooling changes and adjustments, and occasionally an entire welding fixture must be replaced, as, for example, when a different model car body is to be framed. What is needed is a flexible system enabling these adjustments and changes to be made quickly and accurately, preferably by a single person.

SUMMARY OF THE INVENTION

In accordance with this invention, the vehicle body to be welded is mounted on a support between two stands. A fixture carrying welding tools with or without body locators and clamps is mounted on each stand. The stands are preferably mounted for linear movement along a path leading to an operative position adjacent to the support in which the welding operations can be performed. Welding is carried out by the welding tools on the fixtures and also typically by the use of welding robots independent of these fixtures.

During welding, the fixtures are located and locked in predetermined positions with respect to the stands and preferably for this purpose wedges are employed to drive ball-shaped locating pins into conical sockets. The angle of the wedges is relatively small and irreversible so that they will maintain the ball firmly in the socket despite possible failure of the air cylinder typically used to operate the wedge.

Preferably, the fixtures are mounted on the stands on horizontal guide rails. A loader is provided for each fixture for the purpose of transferring a fixture to and from one of the stands. Preferably, the loaders have horizontal guide rails for supporting the fixtures and are movable to and from a transfer position in which the guide rails on the loaders are lined up with the guide rails on the stands so that the fixtures may be transferred from the loaders to the stands and vice versa.

Preferably, the loaders are mounted on turntables to facilitate their movement to and from the transfer positions.

It is an object of this invention to provide a flexible framing system having the foregoing features and capabilities.

Another object is to provide a flexible framing system which is composed of a relatively few simple parts, is rugged and durable in operation, is capable of being quickly and inexpensively manufactured and assembled, and can be operated quickly and easily by a single person.

BRIEF DESCRIPTION OF THE DRAWINGS

These and other objects, features and advantages of the invention will become more apparent as the following description proceeds, especially when considered with the accompanying drawings wherein.

DETAILED DESCRIPTION

Referring now more particularly to the drawings, the framing system of this invention comprises a pair of spaced-apart upright stands 20 and 22 each having laterally spaced towers 24 connected at the top by a horizontal cross bar 26 and at the bottom by a horizontal cross bar 28. Between the stands 20 and 22 is a vehicle body support 30 comprising a plurality of posts 32 on which a car body C is adapted to be supported. Fixtures 34, on which are mounted welding tools 35 as well as body locators and clamps, are adapted to be carried by the stands 20 and 22. At one end of the upright stand 20 is a loader 36. At the same end of stand 22 is a loader 38. Loader 36 is for transferring welding fixtures 34 to and from stand 20. Loader 38 is for transferring welding fixtures 34 to and from stand 22. Loaders 36 and 38 are of identical construction although the arrangement of welding tools, locators and clamps may vary.

Referring to FIGS. 1–4, the upright stands 20 and 22 are mounted on platforms or bed plates 40. Each bed plate has laterally spaced, parallel, horizontal tracks 42. Trolleys 44 on the bottoms of the towers 24 run on the tracks enabling the upright stands to travel linearly along the tracks toward and away from an operative position adjacent the vehicle body support 30. Welding tools 39 and robots 41 may be mounted on the bed plates 40 and have access to a vehicle body C on support 30 through the open frame configuration of the fixtures 34.

Figure 1:
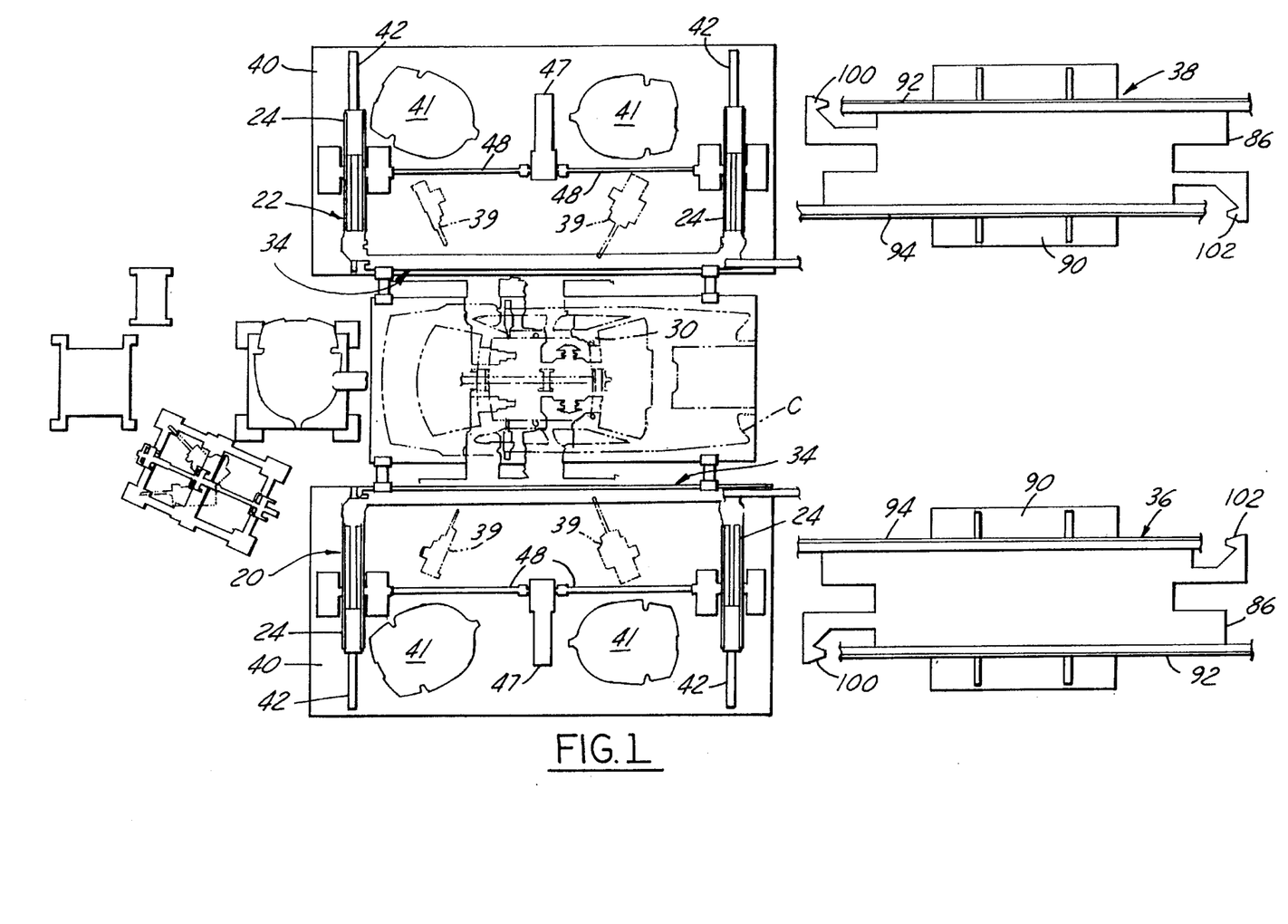
FIG. 1 is a semi-diagrammatic top plan view of a framing system embodying the invention, showing a vehicle body support, platforms at opposite sides of the vehicle body support on which the upright stands are mounted, and loaders for transferring welding fixtures to and from the upright stands.
Figures 2, 3:
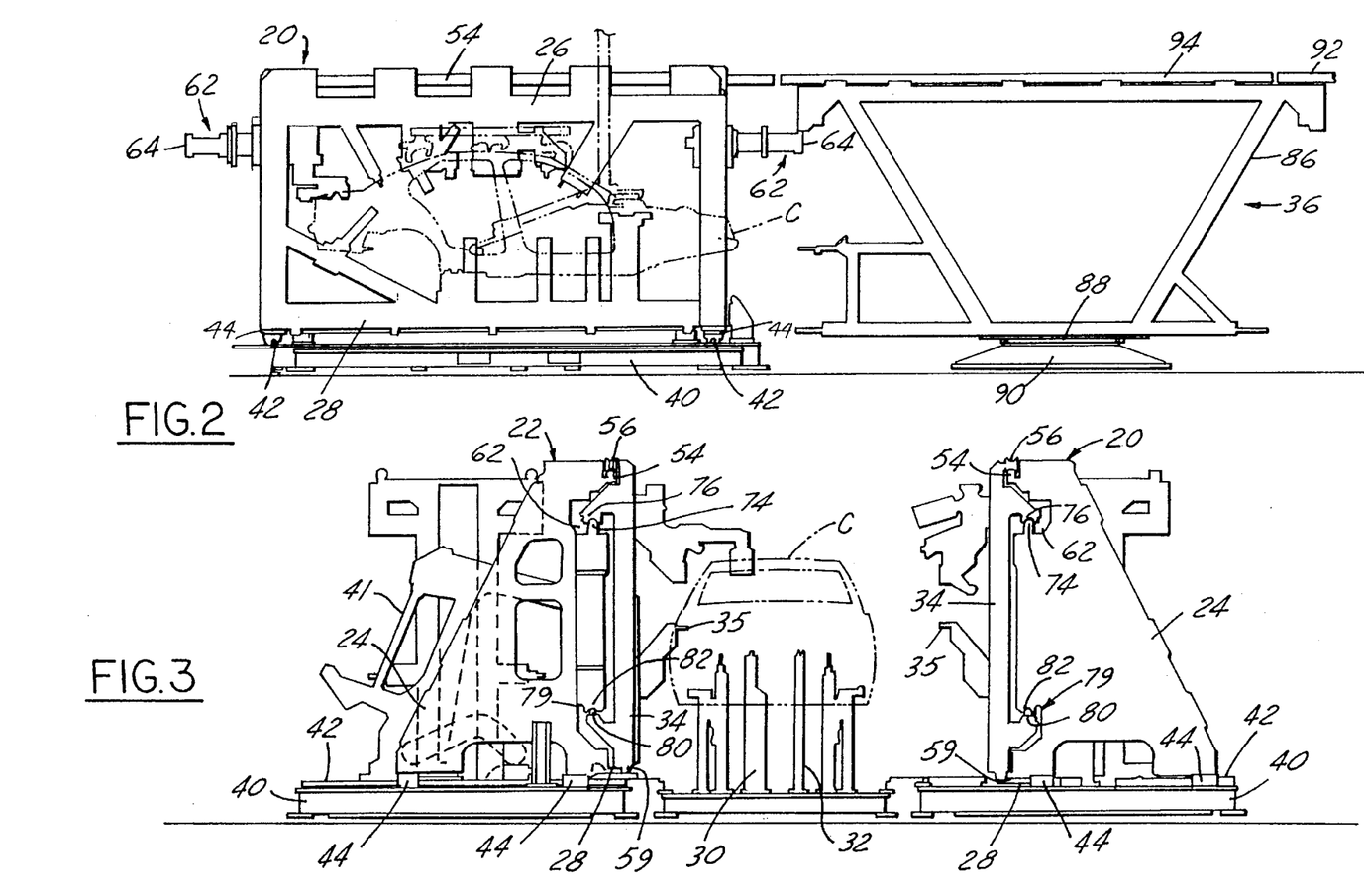
FIG. 2 is a side view of the apparatus of FIG. 1, showing one of the upright stands and one of the loaders.
FIG. 3 is an end view showing welding fixtures mounted on both stands.
Figure 4:
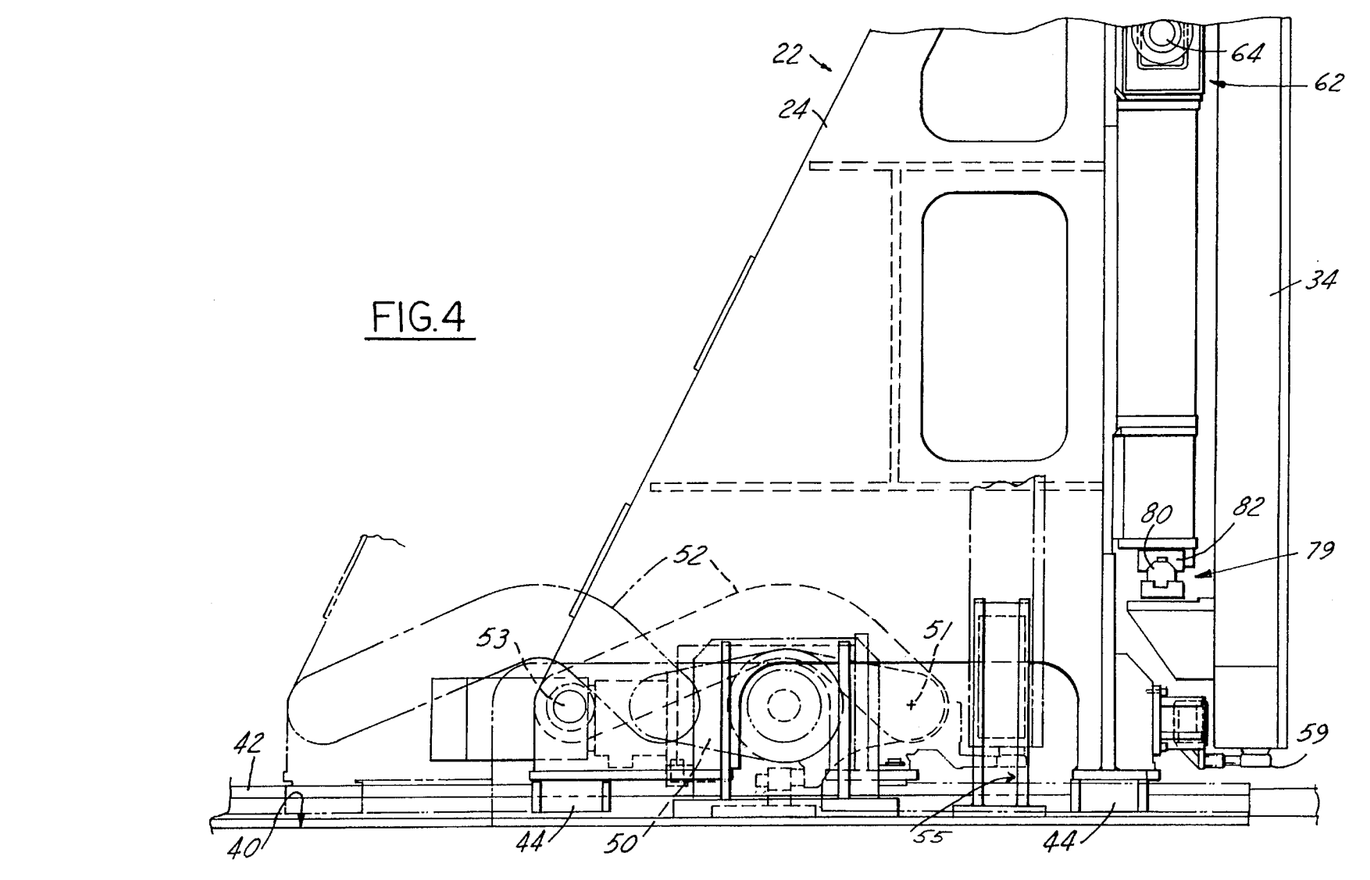
FIG. 4 is an enlarged fragmentary end view showing a lower portion of one of the stands in FIG. 3, and also showing the drive for the stand.
Figure 5:
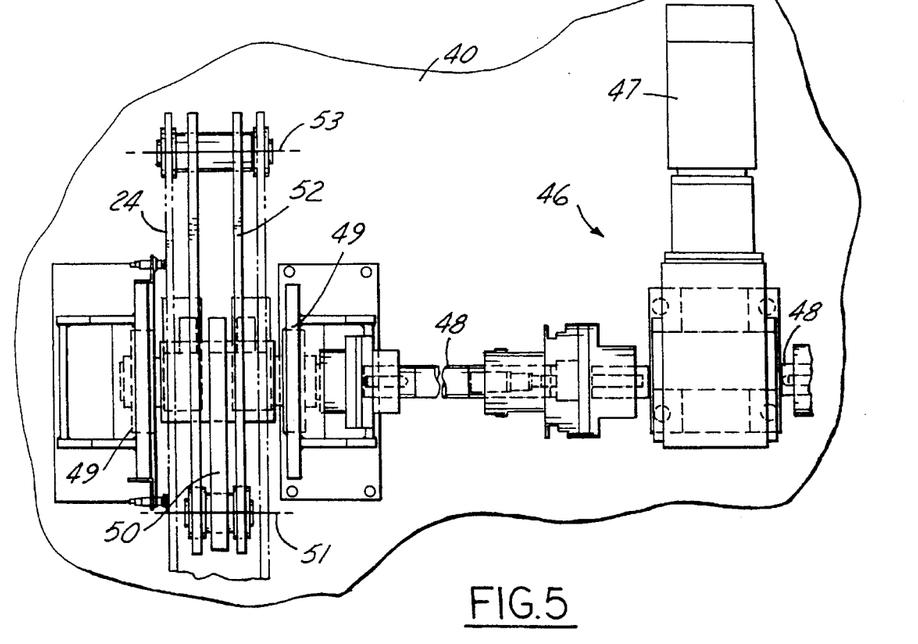
FIG. 5 is a fragmentary top view of a portion of the drive for one of the stands.
Figure 6:
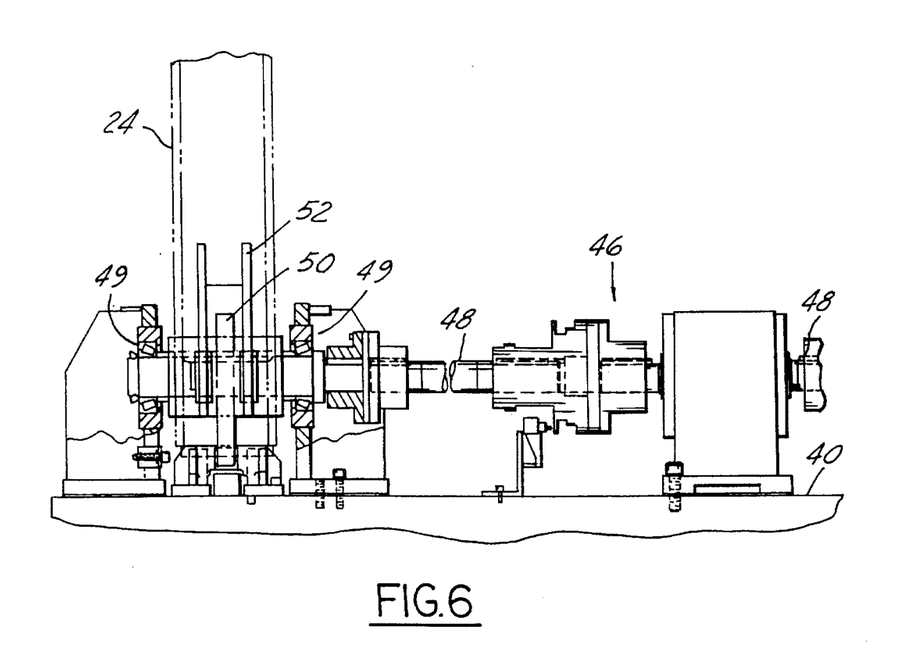
FIG. 6 is a fragmentary side view of the portion of the drive shown in FIG. 5.

A drive unit 46, FIGS. 4–6, is provided for each stand 20, 22, located between the towers thereof. Each drive unit comprises a reversible motor 47, the output shaft of which is geared to a pair of aligned drive shafts 48 rotatable in bearings 49. Shafts 48 extend toward the respective towers and have crank arms 50 projecting radially outwardly near the outer ends thereof. The radially outer end of each crank arm 50 is pivoted at 51 to the inner end of a link 52. The outer ends of the links are pivoted at 53 to the towers so that operation of the motor in one direction will advance the stand toward the vehicle support 30 to an operative position for carrying out a welding operation. When the motor is reversed, the stands are withdrawn laterally outwardly to an inoperative position enabling transfer of fixtures between the loaders 36,38 and stands 20,22 and also facilitating loading and unloading of a vehicle body on the support 30. FIG. 4 shows one of the stands in the advanced, operative position in solid lines, and in the inoperative position in broken lines.

Referring to FIGS. 2, 3, 7 and 8, a horizontal rail 54 extends lengthwise along the cross bar 26 at the top of each stand. Rollers 56 mounted on brackets 58 are spaced apart along the top of each fixture 34. The rollers 56 turn on horizontal axes and are supported on the rails 54 of the stands 20,22 to support the fixtures 34 during transfer from a loader 36,38 to a stand and vice versa. Rollers 59 on the lower edge portion of the fixtures 34 turn on vertical axes and engage and are guided by the cross bars 28 at the bottoms of the stands. Abutments 55 may be provided on the bed plate 40 to prevent fixtures 34 from running off rails 54 on stands 20,22 during transfer thereto from the associated loader.

The fixtures 34 are locked in operative position on the stands 20,22 in position for welding. For this purpose, each stand 20,22 has near the top two locating and locking devices 62, one adjacent each tower 24 (See FIGS. 7 and 8). Each locating and locking device 62 has a horizontal air cylinder 64 mounted on a tower. Each air cylinder 64 has a piston (not shown) from which a horizontal piston rod 65 extends. A wedge 66 on the outer end of the piston rod extends into a slot 68 formed in a vertical pin 70. The pin 70 slides vertically in a guide 72 on the tower and has a spherical head 74 on the upper end which is engageable in a conical socket 76 secured to the fixture 34. When the air cylinder 64 is actuated to retract the piston rod 65, the wedge raises pin 70 causing the head 74 to enter the socket 76 and lock the fixture in a properly located position. The surface 78 of the wedge engaging the pin slot forms a small and irreversible angle such that the wedge will maintain the head 74 in firm locating and locking engagement with socket 76 despite possible failure of the air cylinder.

Figure 7:
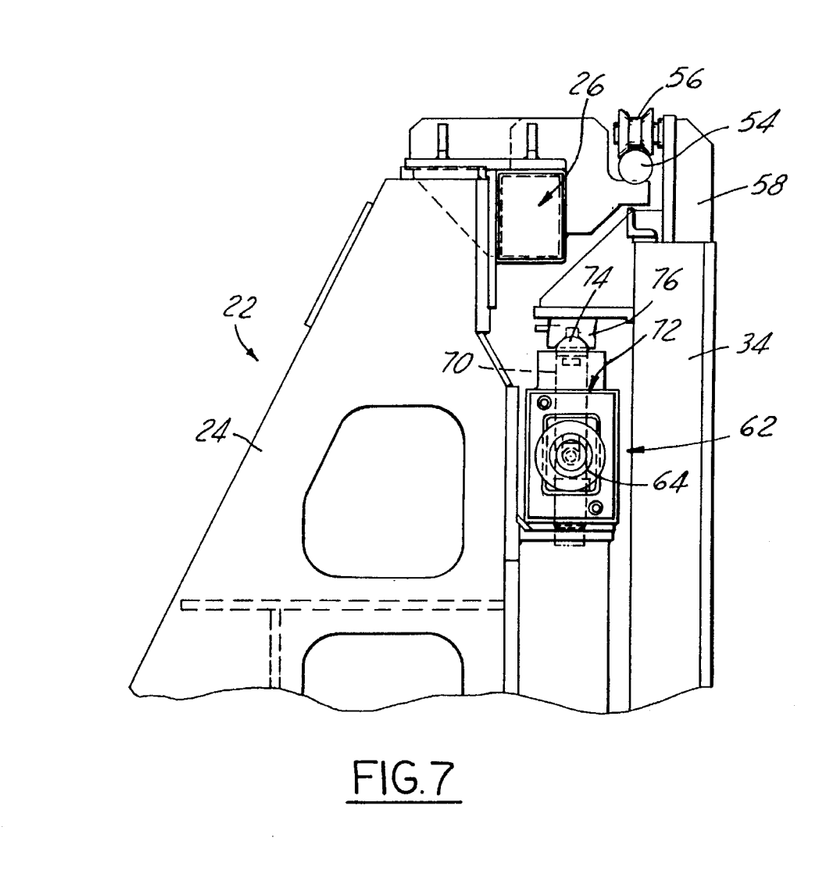
FIG. 7 is an enlarged fragmentary end view of an upper portion of one of the stands in FIG. 3, and also showing a device for locating and locking a welding fixture to the stand.
Figure 8:
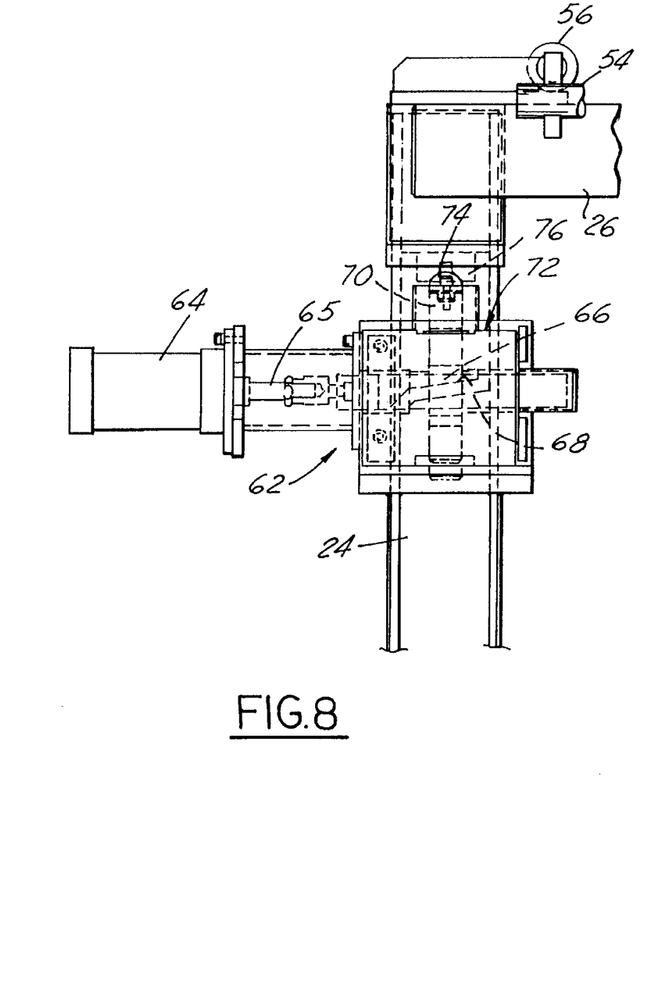
FIG. 8 is a side view of the structure of FIG. 7.

When the pin heads 74 of each locating and locking device 62 engage in the sockets 76 as thus described, the fixture is raised a very small amount to engage for each fixture two supplemental locking devices 79, one beneath each of the pins 70. The supplemental locking devices 79 comprise semi-cylindrically shaped heads 80 mounted on the fixture 34 near its lower edge. When the fixture is raised by the pin heads 74, the semi-cylindrically shaped heads 80 near the bottom of the fixture 34 engage in V-shaped sockets 82 on the two towers of each stand to complete the locking of the fixture in predetermined position.

Referring to FIGS. 1, 2 and 9–11, each loader 36,38 has an upright frame 86 mounted on a turntable 88 which rotates on a base 90 about a vertical axis. Mounted on top of the frame 86 of each loader are two horizontal rails 92 and 94 disposed side-by-side in laterally spaced, parallel relation to one another. Each of the loaders 36,38 can support two fixtures by having the rollers 56 of one fixture engaged over the rail 92 and the rollers of the other fixture engaged over the rail 94.

Figure 9:
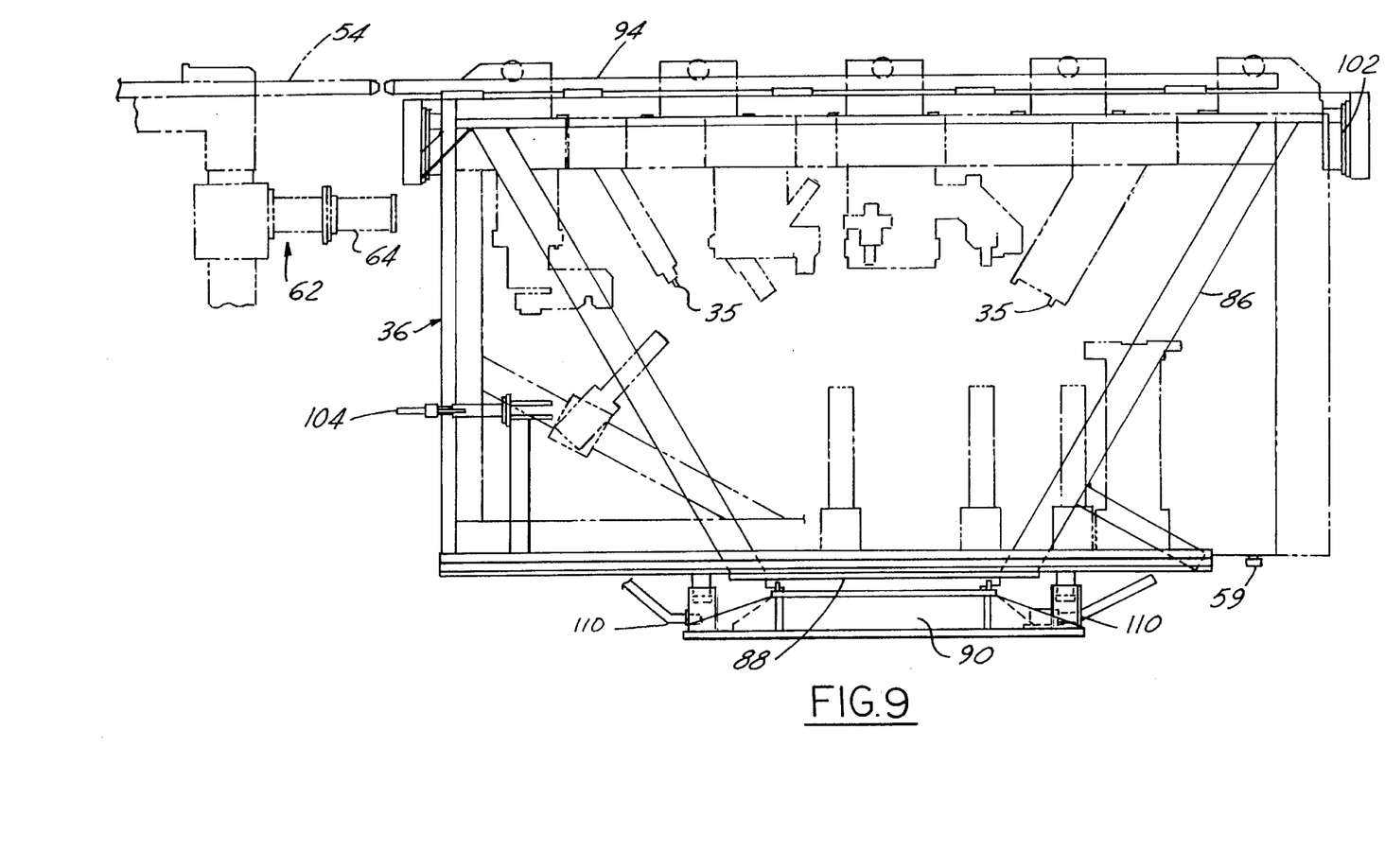
FIG. 9 is a side view of one of the loaders.
Figure 10:
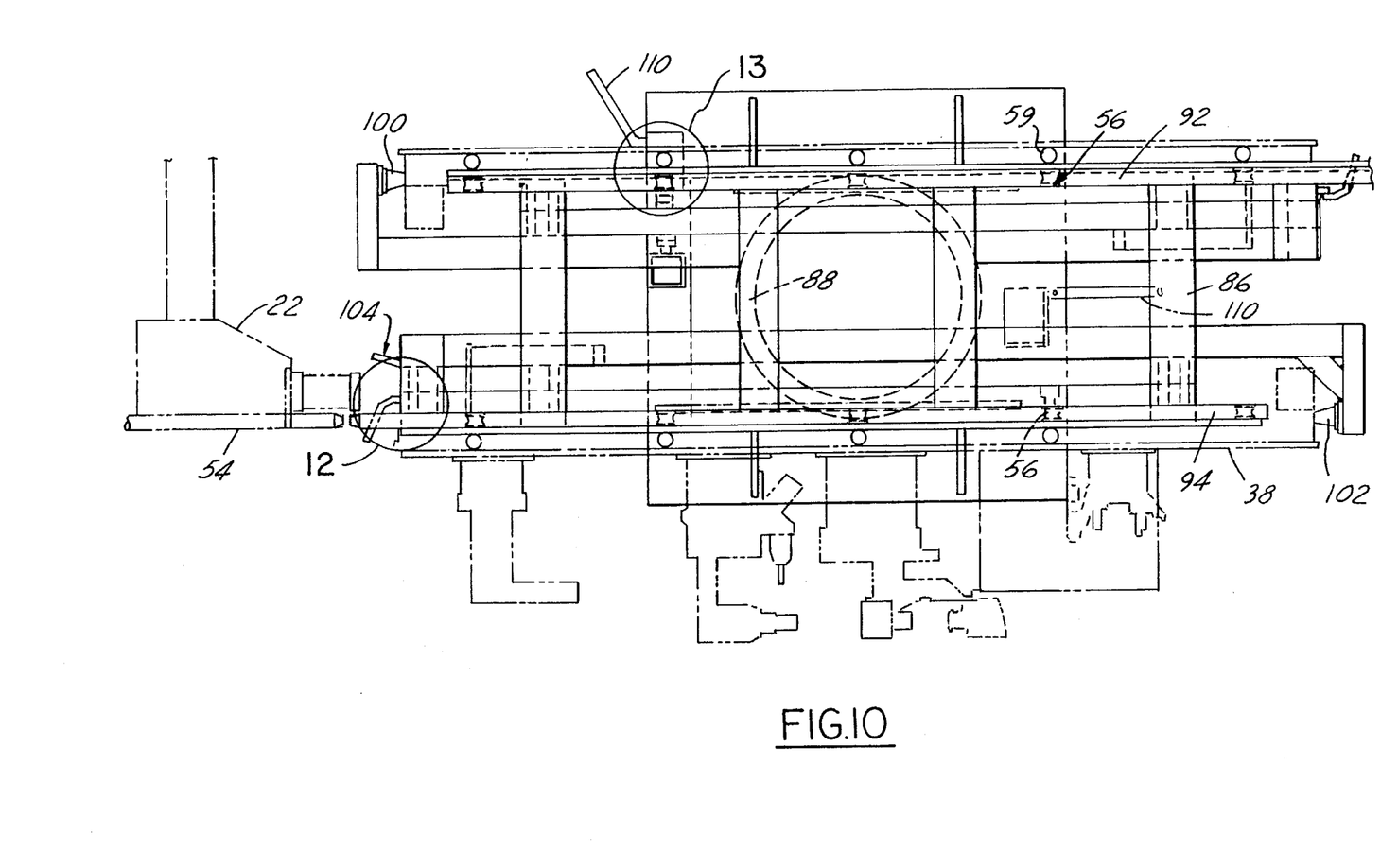
FIG. 10 is a top view of a loader.
Figure 11:
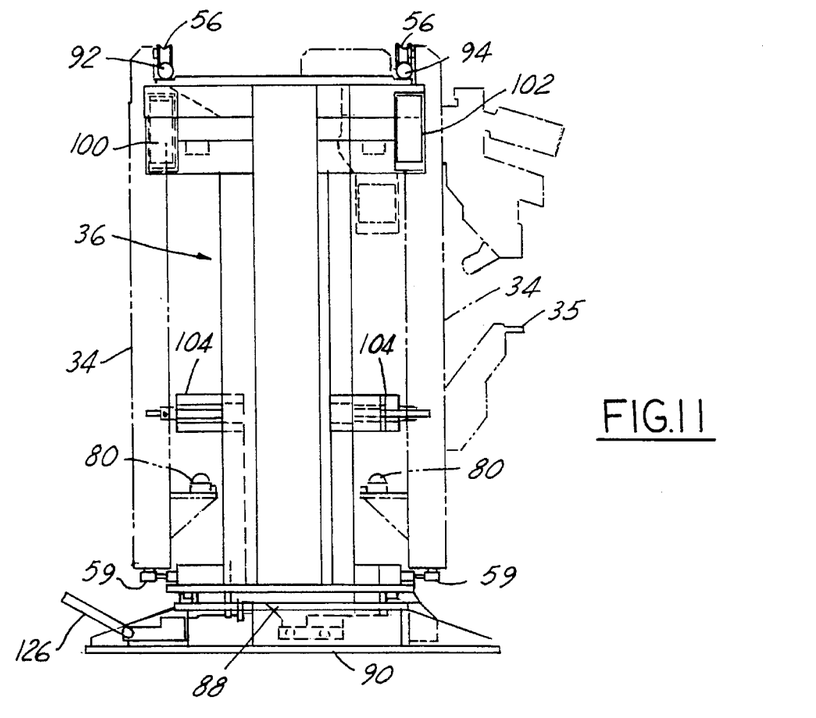
FIG. 11 is an end view of a loader.

The frame 86 of each loader has two abutments 100 and 102. The abutment 100 is at one end of the rail 92 and the abutment 102 is at the opposite end of the other rail 94. The abutments are provided to prevent a fixture from running off one end of the rail on which it is supported. The other ends of the rails 92,94 are clear of any abutments to facilitate transfer of a fixture from a rail 92 or 94 on the loader to the rail 54 on the adjacent stand.

Figures 12, 13:
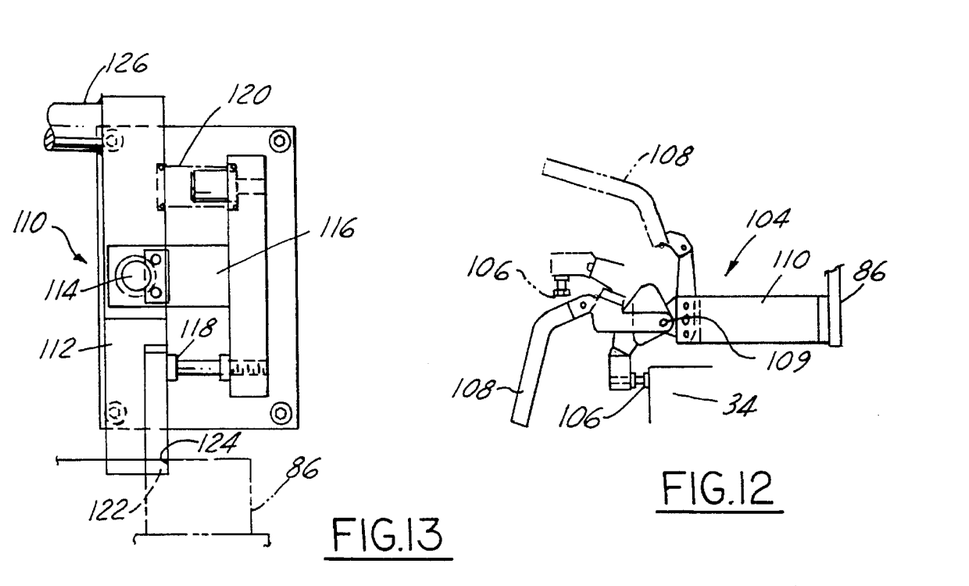
FIG. 12 is an enlarged fragmentary view of a locking mechanism for the welding fixture, shown within the circle 12 in FIG. 10.
FIG. 13 is an enlarged fragmentary view of a locking mechanism for the loader, shown within the circle 13 in FIG. 10.

Prior to transferring a fixture from the rail 92, the fixture is clamped against the abutment 100 by a toggle clamping device 104 and thereby held from moving (See FIG. 12). A similar toggle clamping device 104 is provided for clamping a fixture on rail 94 against abutment 102. Each clamping device 104 comprises a stop 106 engageable with one end of a fixture. The stop 106 is carried by an arm 108 pivoted at 109 to a bracket 110 on the frame 86 of the fixture. The arm 108 can be pivoted to the broken line position of FIG. 12 to release the fixture.

The loaders 36,38 are so located relative to the respective stands 20,22 that the rail 92 of the loader, when the loader frame is in one rotative position, is aligned with the rail 54 on the stand in substantially end-to-end abutting or slightly spaced apart relation (see FIG. 9). The stand at this time is in its retracted position. Of course, it is the free end of the rail 92 which is clear of any abutment which is in this end-to-end relationship with the rail on the stand. In this rotative position of the loader, a fixture on the rail 92 of the loader may be transferred to the rail 54 on the stand or vice versa.

Each loader is capable of being rotated 180° so that the other rail 94 of the loader is aligned with and in end-to-end substantially abutting relation with the rail 54 on the associated stand. In this position, a fixture may also be transferred from the loader to the stand or vice versa.

Each loader is capable of being locked in the two rotative positions 180° apart by locking devices 110 of similar construction. Each locking device 110 has an arm 112 pivoted at 114 to a bracket 116 on the base. The arm is moved counterclockwise in FIG. 13 against a stop 118 by a compression spring 120, in which position a locking portion 122 of the arm engages in a recess 124 in the frame 86 of the turntable to prevent it from rotating. The arm is rotated clockwise against the action of the spring 120 to release the turntable by a handle 126.

When it is desired to transfer a welding fixture from one of the loaders 36 or 38 to its associated stand 20 or 22, the stand is retracted to its outer limit and the loader is turned to a position in which one of its rails 92,94 is aligned end to end with the rail 54 on the stand. A fixture 34 on that aligned rail of the loader may then be moved onto the rail 54 of the stand where it is clamped in proper position by means of the locking devices 62 and 79. The stand may then be advanced to its operative position to perform welding operations on a vehicle body on the support 30. The stand is moved, of course, by the operation of drive unit 46 and the clamping of the fixture to the stand is accomplished by operation of the air cylinders 64.

After a specific model run is completed, the stand may be retracted so that its rail 54 which supports the welding fixture 34 is again aligned with the rail 92 on the associated loader, permitting the fixture to be removed from the stand and transferred to the loader. If a replacement fixture 34 has been mounted on the other rail 94 of the loader and the loader is turned 180°, the other loader rail 94 will be now aligned with the rail 54 on the stand. The replacement fixture may be rolled off of the rail 94 on the loader to the support rail 54 on the stand and clamped to the stand so that a welding operation may be performed on yet another model of vehicle body on the support 30.

It should be understood that all of these operations can be performed by a single operator. The loaders may be rotated by hand and locked in position and unlocked by the same person who may also operate the air cylinders 64 for the locating and locking devices 62 on the stands. That person may manually move a fixture from a loader to a stand and vice versa and may operate the stand motors from a convenient control panel. The operations are quick and easy and as stated, can be easily carried out by a single person.

Electrical and air service required for each fixture 34 is disconnected by the operator preferably via a "quick disconnect" device, and reattached to the new fixture after it is rolled into place.

We claim:

1. A framing system for welding an automotive vehicle body comprising, first and second generally upright stands disposed in laterally spaced apart relation, a support for a vehicle body between said stands, a first fixture on said first stand, a second fixture on said second stand, welding tools on said fixtures for performing welds on a vehicle body on said support, a guide mounting each stand for linear movement along a path toward and away from an operative position adjacent to said support, power mechanism for moving said stands along said paths, air of first devices for locating and locking said first fixture to said first stand, a pair of second devices for locating and locking said second fixture to said second stand, said pair of first devices being arranged in laterally spaced relation, said second pair of devices being arranged in laterally spaced relation, each device comprising male and female members, said members of each device being mounted, respectively, on one of the stands and on the associated fixture, and means for relatively moving said members into locating and locking engagement with one another, said moving means comprising a wedge engaging one of said members, and a power unit for driving said wedge into engagement with said one of said members causing said one of said members to be driven into firm locating and locking engagement with the other of said members.

2. A framing system for welding an automotive vehicle body comprising, first and second generally upright stands disposed in laterally spaced apart relation, a support for a vehicle body between said stands, a first fixture on said first stand, a second fixture on said second stand, welding tools on said fixtures for performing welds on a vehicle body on said support, a guide mounting each stand for linear movement along a path toward and away from an operative position adjacent to said support, and power mechanism for moving said stands along said paths, said power mechanism comprising a drive unit for each of said stands, a rotary output shaft extending from each drive unit, a crank arm extending from said output shaft, and a link having a first end pivoted to said crank arm and a second end pivoted to one of said stands.

3. A framing system for welding an automotive vehicle body comprising, first and second generally upright stands disposed in laterally spaced apart relation, a support for a vehicle body between said stands, a first fixture on said first stand, a second fixture on said second stand, welding tools on said fixtures for performing welds on a vehicle body on said support, a guide mounting each stand for linear movement along a path toward and away from an operative position adjacent to said support, power mechanism for moving said stands along said paths, a first device for locating and locking said first fixture to said first stand and a second device for locating and locking said second fixture to said second stand, each locating and locking device comprising male and female members, and means for relatively moving said members into locating and locking engagement with one another, said moving means comprising a wedge engaging one of said members, and a power unit for driving said wedge into engagement with said one of said members causing said one of said members to be driven into firm locating and locking engagement with the other of said members.

4. A system as defined in claim 3, wherein each said wedge has a tapered wedging surface engaging said one of said members at a relatively small and irreversible angle so that said wedge will maintain said members in firm locating and locking engagement despite possible failure of said power unit.

5. A system as defined in claim 4, wherein each said power unit is a piston-cylinder assembly.

6. A system as defined in claim 5, wherein said other member of each said first device is mounted on said first fixture and said one member thereof is mounted thereebeneath on said first stand for upward movement by the associated power unit, said other member of each said second device is mounted on said second fixture and said one member thereof is mounted therebeneath on said second stand for upward movement by the associated power unit, whereby said fixtures are elevated slightly relative to said stands when said one member of each said device is driven upwardly into locating and locking engagement with the other member thereof.

7. A system as defined in claim 6, and further including a pair of third devices for locating and locking said first fixture to said first stand, and a pair of fourth devices for locating and locking said second fixture to said second stand, each of the third and fourth devices comprising interengaging members, one of which is on the stand and the other on the fixture which interengage automatically upon the aforesaid slight elevation of the fixture.

8. A system as defined in claim 7, wherein each said wedge has a tapered wedging surface engaging said one of said members at a relatively small and irreversible angle so that said wedge will maintain said members in firm locating and locking engagement despite possible failure of said power unit, and wherein each power unit is an air cylinder.

9. A system as defined in claim 3, wherein said other member of said first device is mounted on said first fixture and said one member thereof is mounted therebeneath on said first stand for upward movement by the associated power unit, said other member of said second device is mounted on said second fixture and said one member thereof is mounted therebeneath on said second stand for upward movement by the associated power unit, whereby said fixtures are elevated slightly relative to said stands when said one member of each said device is driven upwardly into locating and locking engagement with the other member thereof.

10. A framing system for welding an automotive vehicle body comprising, first and second generally upright stands disposed in laterally spaced apart relation, a support for a vehicle body between said stands, a first fixture on said first stand, a second fixture on said second stand, welding tools on said fixtures for performing welds on a vehicle body on said support, a guide mounting each stand for linear movement along a path toward and away from an operative position adjacent to said support, power mechanism for moving said stands along said paths, first and second horizontal guide rails on said respective first and second stands for slidably receiving said respective fixtures, a first loader for transferring the first fixture to and from said first stand, a second loader for transferring the second fixture to and from said second stand, first and second horizontal guide rails on said respective first and second loaders for slidably receiving said respective fixtures, a third horizontal guide rail mounted on said first loader in laterally spaced parallel relation to the first guide rail thereon, a fourth horizontal guide rail mounted on said second loader in laterally spaced parallel relation to the second guide rail thereon, and turntables mounting said respective loaders for rotation about vertical axes from a first transfer position in which said first and second guide rails of said first and second loaders are aligned in juxtaposed end-to-end relation with said first and second guide rails of said respective first and second stands to a second transfer position 180° from the first transfer position in which said third and fourth guide rails of said first and second loaders are aligned in juxtaposed end-to-end relation with said first and second guide rails of said respective first and second stands.

11. A system as defined in claim 10, wherein said first and second rails of said respective first and second loaders have first ends substantially abutting said first and second guide rails of said first and second stands in said first transfer positions of said loaders, said first and second guide rails of said first and second loaders having second ends, abutments on said loaders engageable with said fixtures to prevent them from sliding off the second ends of said first and second guide rails of said loaders, said third and fourth guide rails of said respective first and second loaders having first ends substantially abutting said first and second guide rails of said first and second stands in said second transfer positions of said loaders, said third and fourth rails of said first and second loaders having second ends, and abutments on said loaders engageable with said fixtures to prevent them from sliding off the second ends of said third and fourth guide rails of said loaders.

12. A system as defined in claim 11, and further including means for releasably locking said turntables in the first and second transfer positions of said loaders.

13. A system as defined in claim 11, and further including means for locking said fixtures against movement on the rails of said loaders.

14. A system as defined in claim 11, and further including means for locking said fixtures against movement of the rails of said stands.

* * * * *